United States Patent
Song

(10) Patent No.: US 8,248,468 B2
(45) Date of Patent: Aug. 21, 2012

(54) SUPPORT STAND AND IMAGING MEASUREMENT DEVICE USING THE SAME

(75) Inventor: Shang-Xuan Song, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 470 days.

(21) Appl. No.: 12/582,844

(22) Filed: Oct. 21, 2009

(65) Prior Publication Data

US 2010/0328449 A1 Dec. 30, 2010

(30) Foreign Application Priority Data

Jun. 26, 2009 (CN) .......................... 2009 1 0303749

(51) Int. Cl.
*H04N 7/18* (2006.01)
*G06F 12/00* (2006.01)
(52) U.S. Cl. ........................................ 348/135; 248/689
(58) Field of Classification Search .................. 348/135; 248/689–691
See application file for complete search history.

(56) References Cited

U.S. PATENT DOCUMENTS

| | | | | |
|---|---|---|---|---|
| 5,444,486 A | * | 8/1995 | Mizuno et al. | 348/376 |
| 5,732,912 A | * | 3/1998 | Nomura et al. | 248/187.1 |
| 6,123,306 A | * | 9/2000 | Jackson | 248/296.1 |
| 6,439,515 B1 | * | 8/2002 | Powers | 248/129 |
| 2005/0040298 A1 | * | 2/2005 | Ohki et al. | 248/176.1 |
| 2006/0239677 A1 | * | 10/2006 | Friedrich | 396/419 |
| 2009/0116831 A1 | * | 5/2009 | Lindsay | 396/301 |

* cited by examiner

*Primary Examiner* — Zarni Maung
(74) *Attorney, Agent, or Firm* — Altis Law Group, Inc.

(57) ABSTRACT

A support stand includes a support member, and a connecting module assembled on the support member. The connecting module includes a first adjustment member, a first connection member rotatably connected to the first adjustment member, a second adjustment member assembled on the support member, a second connection member rotatably connected to the second adjustment member, and a fixing member connecting the first adjustment member and the second connection member. The connecting module further includes two first clamping members assembled on the first adjustment member to clamp the first connection member, and two second clamping members assembled on the second adjustment member to clamp the second connection member. The first and second clamping members are capable of adjusting the rotating angle of the first and second connection member around a first and second axis, respectively. An imaging measurement device utilizing the support stand is also provided.

20 Claims, 4 Drawing Sheets

SUPPORT STAND AND IMAGING MEASUREMENT DEVICE USING THE SAME

BACKGROUND

1. Technical Field

The present disclosure relates to a support stand and an imaging measurement device using the support stand.

2. Description of Related Art

Imaging measurement devices offer advantages over traditional measuring devices such as high flexibility, no contact with the measured object, high efficiency, and high precision.

A typical imaging measurement device includes a support stand on a surface and a charge coupled device (CCD) camera assembled on the support stand. The CCD camera captures an image of a testing subject and transfers the image to an image analysis unit to obtain shape and dimension information of the testing subject. For maximum measurement precision, a central axis of the CCD camera is perpendicular to the surface. However, in the typical imaging measurement device, the CCD camera is fixed on the support stand and cannot be adjusted to ensure the CCD camera is perpendicular to the surface. As a result, the measuring precision of the typical imaging measurement device may be decreased.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

Figure 1:
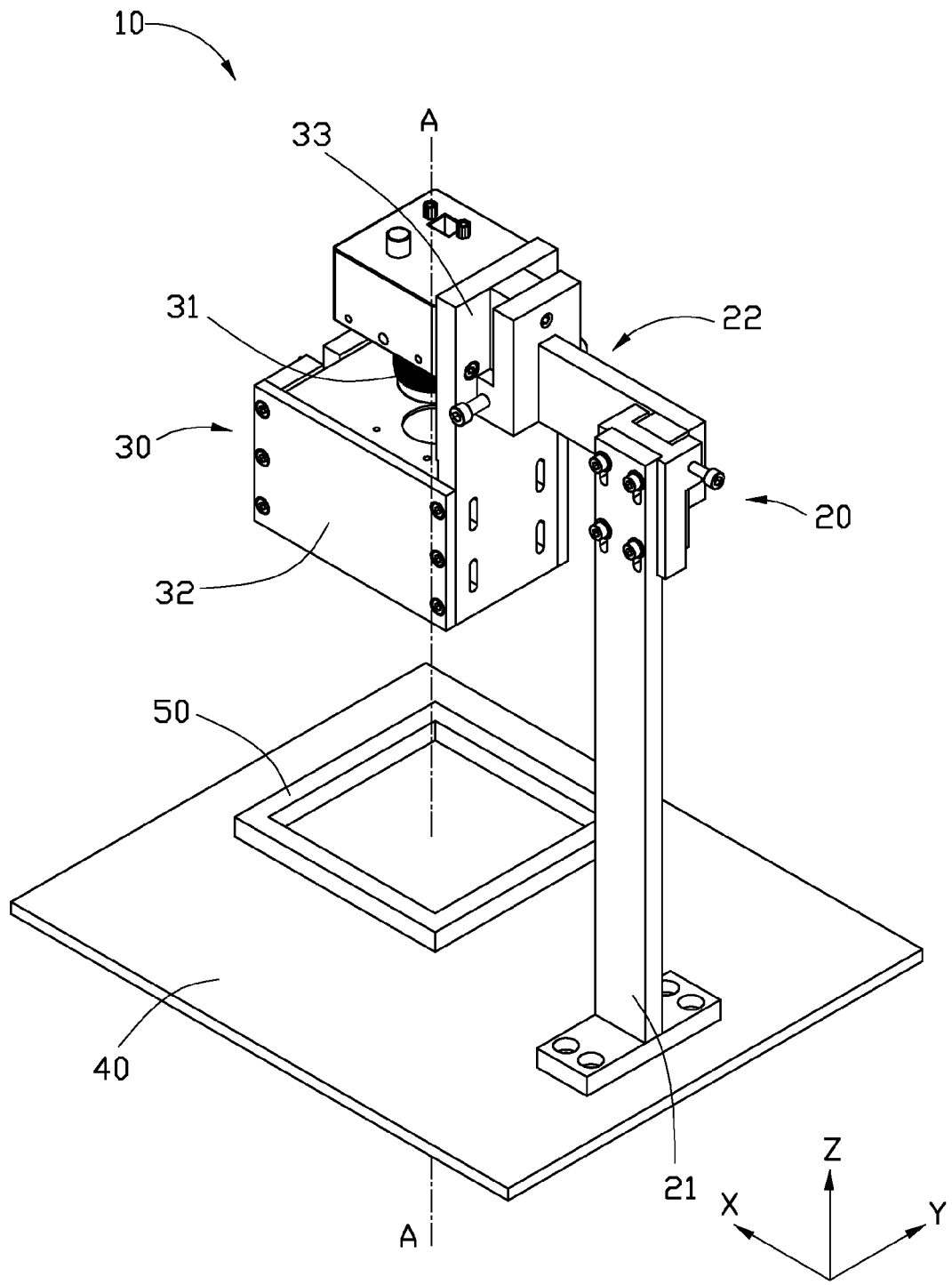
FIG. 1 is an assembled, isometric view of an embodiment of an imaging measurement device, the imaging measurement device including an embodiment of a support stand.

Referring to FIG. 1, an embodiment of an imaging measurement device 10 includes an embodiment of a support stand 20 and a camera module 30 assembled on the support stand 20. The support stand 20 sits on a surface 40. An object 50 is placed on the surface 40 below the camera module 30. The camera module 30 captures an image of the object 50 and transfers the image to an image analysis unit (not shown) to obtain shape and dimension information of the object 50.

The camera module 30 includes a camera lens 31, a light source 32 positioned below the camera lens 31, and a rear plate 33 fixing the camera lens 31 and the light source 32. The camera lens 31 has a central axis A-A substantially perpendicular to the surface 40. The light source 32 emits light to illuminate the object 50.

Figure 2:
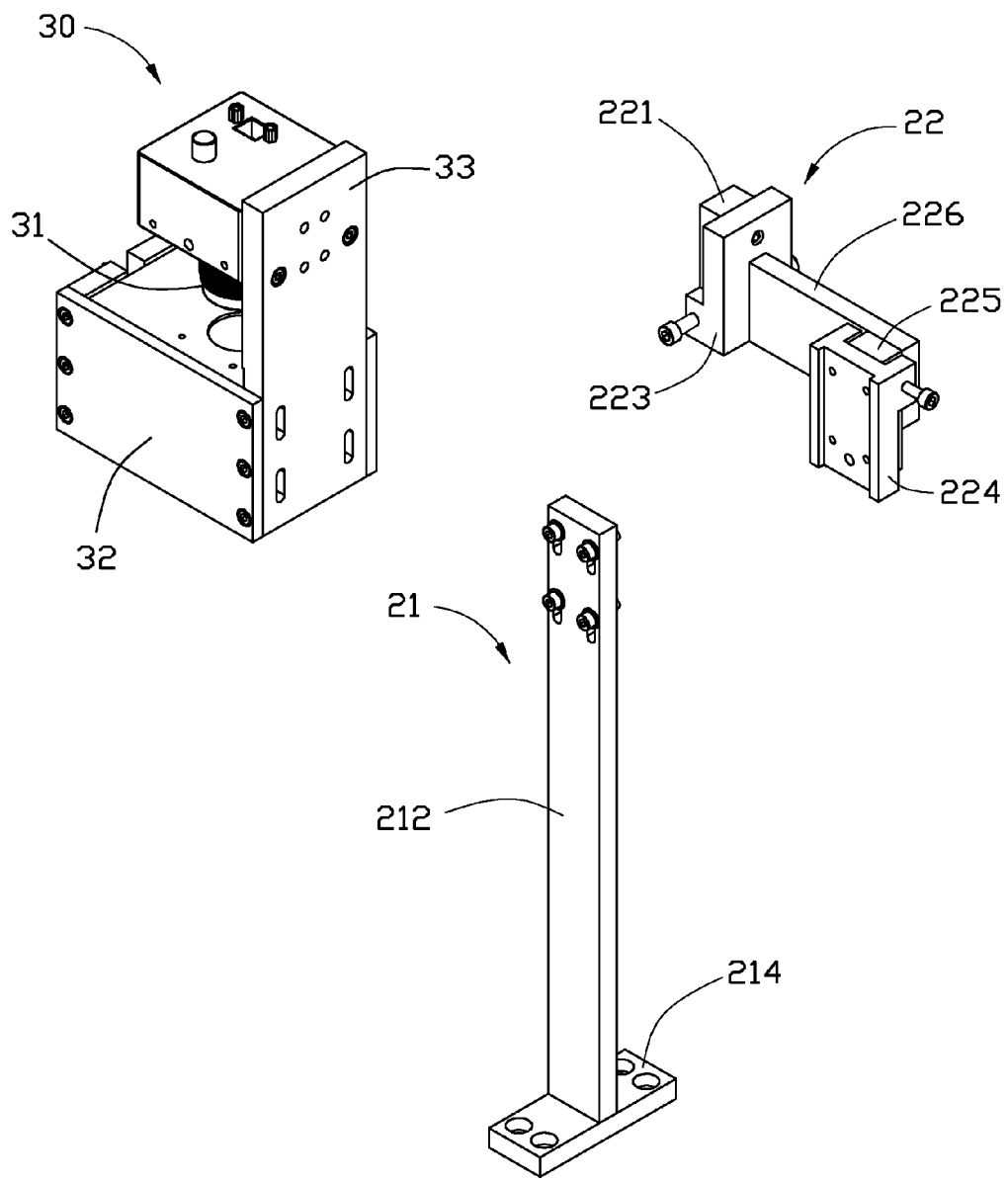
FIG. 2 is a partially exploded, isometric view of the support stand, applied in an imaging measurement device, such as, for example, that in FIG. 1.

Referring also to FIG. 2, the support stand 20 includes a support member 21 and a connecting module 22 slidably assembled on the support member 21 and fixed to the camera module 30.

Figure 3:
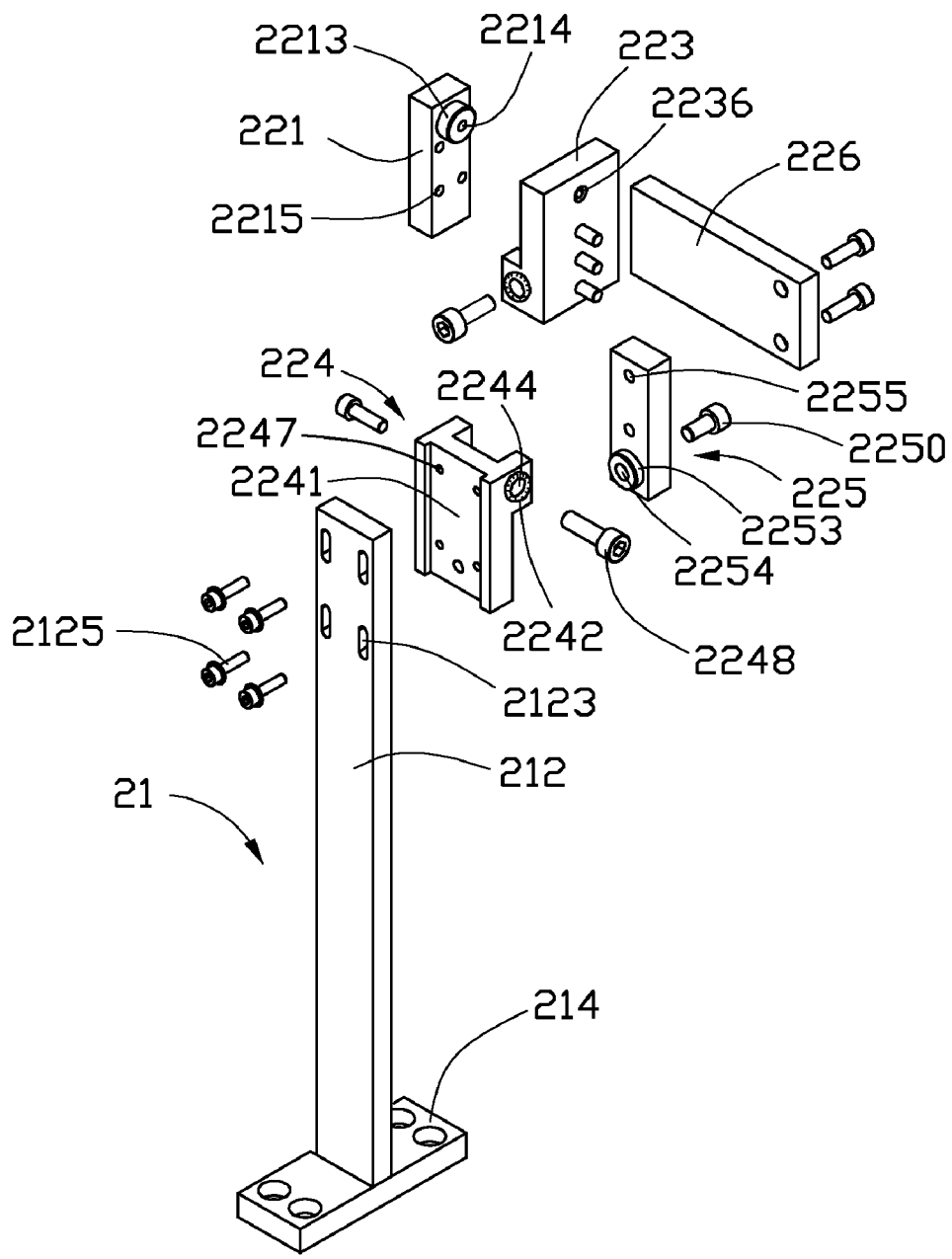
FIG. 3 is an exploded, isometric view of the support stand in FIG. 2.
Figure 4:
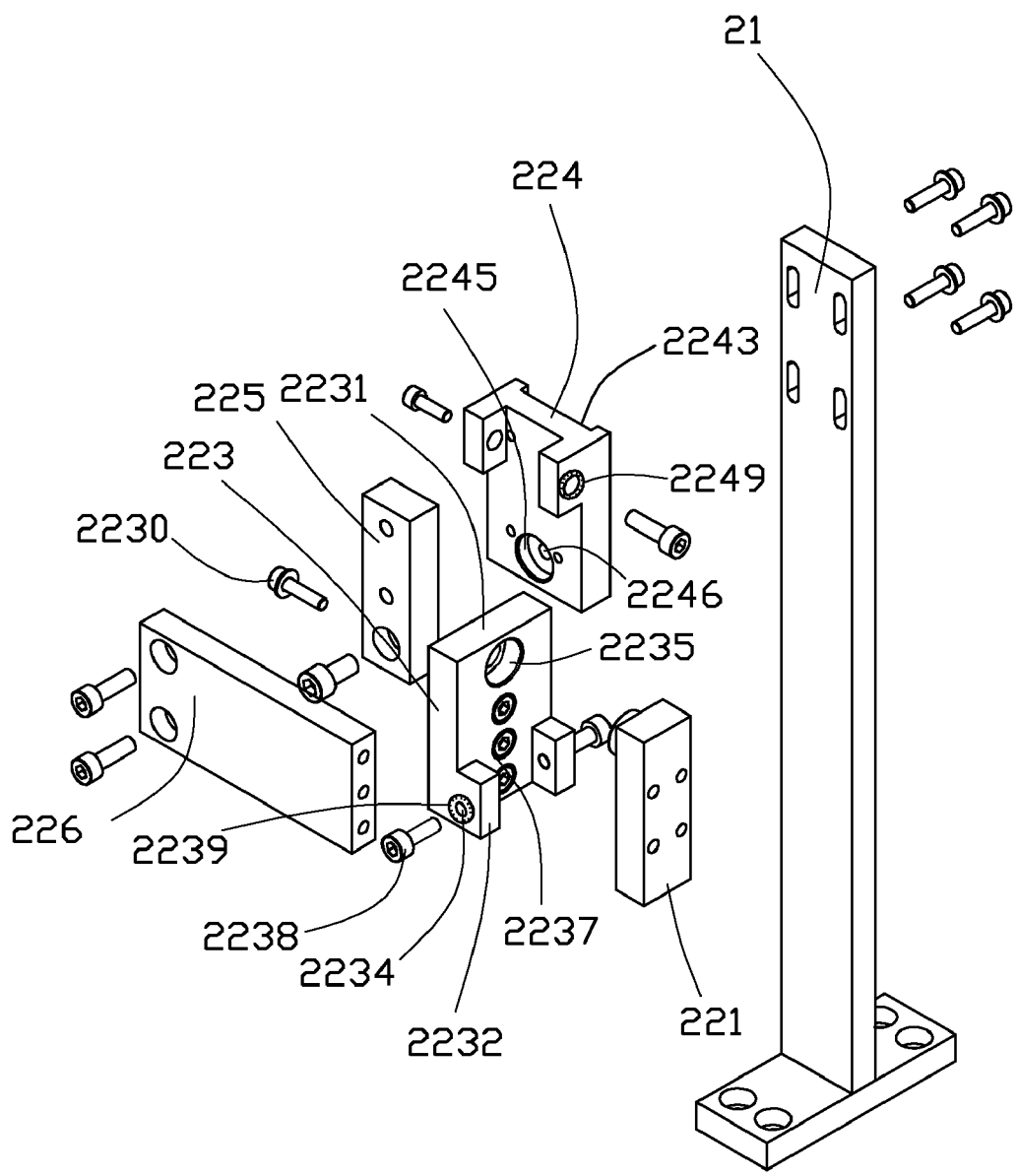
FIG. 4 is similar to FIG. 3, but viewed from another aspect.

Referring also to FIGS. 3 and 4, the support member 21 includes a base portion 214 mounted on the surface 40, and a supporting plate 212 extending substantially perpendicular from the base portion 214. The supporting plate 212 defines a plurality of sliding holes 2123 in an upper end away from the base portion 214. A plurality of securing members 2125 are received in the sliding holes 2123.

The connecting module 22 includes a first connection member 221, a first adjustment member 223, a second connection member 225, a second adjustment member 224, and a fixing member 226. The first connection member 221 is fixed to the camera module 30 and rotatably connected to the first adjustment member 223. The second adjustment member 224 is slidably assembled on the support member 21 and rotatably connected to the second connection member 225. The fixing member 226 fixes the first adjustment member 223 and the second connection member 225.

The first connection member 221 may be a substantially rectangular block, and forms a pivotal portion 2213 on a side away from the rear plate 33. The pivotal portion 2213 defines an engaging hole 2214 in a center thereof. The first connection member 221 defines a plurality of fixing holes 2215 to fix the first connection member 221 on the rear plate 33.

The first adjustment member 223 includes a substantially rectangular main body 2231, and two side portions 2232 extending substantially perpendicular from opposite sides of the main body 2231. The main body 2231 defines a receiving groove 2235 to receive the pivotal portion 2213. The bottom surface of the receiving groove 2235 defines a through hole 2236 in a center. The main body 2231 also defines a plurality of fixing holes 2237 to fix the main body 2231 on the fixing member 226. Each side portion 2232 defines a threaded hole 2234. Two clamping members 2238 are received in the threaded holes 2234 from opposite sides of the first adjustment member 223. In the illustrated embodiment, the clamping members 2238 are screws. A ring-shaped ruler 2239 is positioned on the periphery of each threaded hole 2234.

The second connection member 225 is substantially similar to the first connection member 221. The second connection member 225 forms a pivotal portion 2253 on a side away from the fixing member 226. The pivotal portion 2253 defines a through hole 2254 in a center. The second connection member 225 defines a plurality of fixing holes 2255 to fix the second connection member 225 on the fixing member 226.

The second adjustment member 224 is substantially similar to the first adjustment member 223, and includes a main body 2241, and two side portions 2242. The main body 2241 defines a sliding groove 2243 in a first surface to slidably connect to the support member 21, and a receiving groove 2245 in a second surface to receive the pivotal portion 2253. The bottom surface of the receiving groove 2245 defines an engaging hole 2246 in a center. The main body 2241 also defines a plurality of mounting holes 2247 to allow the securing members 2125 to be assembled therein. Each side portion 2242 defines a threaded hole 2244. Two clamping members 2248 are received in the threaded holes 2244 from opposite sides of the second adjustment member 224. In the illustrated embodiment, the clamping members 2248 may be screws. A ring-shaped ruler 2249 is positioned on the periphery of each threaded hole 2244.

During assembly, the first connection member 221 is clamped between the side portions 2232 of the first adjustment member 223 by the clamping members 2238. The pivotal portion 2213 is rotatably received in the receiving groove 2235. A fastening member 2230 extends through the through hole 2236 and engages the engaging hole 2214, thus fixing the first connection member 221 to the first adjustment member 223. The second connection member 225 is clamped between the side portions 2242 of the second adjustment member 224 by the clamping members 2248. The pivotal portion 2253 is rotatably received in the receiving groove 2245. A fastening member 2250 extends through the through hole 2254 and engages the engaging hole 2246, thus fixing the second connection member 225 to the second adjustment member 224. The first adjustment member 223 and the second connection member 225 are then connected by the fixing member 226. The securing members 2125 are slidably received through the sliding holes 2123 of the support member 21 and engage the mounting holes 2247 of the second adjustment member 224, thus slidably assembling the second adjustment member 224 on the support member 21. Finally, the first connection member 221 is fixed on the rear plate 33 of the camera module 30.

Referring also to FIG. 1, the camera module 30 can be adjusted to ensure that the central axis A-A of the camera lens 31 is perpendicular to the surface 40. If the camera module 30 is to be rotated around an axis X (shown in FIG. 1), the fastening member 2230 is loosened, one clamping member 2238 is received into the threaded hole 2234, and the other clamping member 2238 is withdrawn from the threaded hole 2234, thus the first connection member 221 abuts the clamping member 2238 and rotates around the axis X, thereby rotating the camera module 30 around the axis X. When the camera module 30 reaches a desired angle, the first connection member 221 is tightly clamped by the clamping members 2238, and the fastening member 2230 is tightened to fix the first connection member 221. Similarly, if the camera module 30 is to be rotated around an axis Y, the fastening member 2250 is loosened, one clamping member 2248 is received into the threaded hole 2244, and the other clamping member 2248 is withdrawn from the threaded hole 2244, thus the second connection member 225 abuts the clamping member 2248 and rotates around the axis Y, thereby rotating the camera module 30 around the axis Y. When the camera module 30 reaches a desired angle, the second connection member 225 is tightly clamped by the clamping members 2248, and the fastening member 2250 is tightened to fix the second connection member 225. During the adjustment, the rulers 2239, 2249 indicate the rotating angle of the clamping members 2238, 2248, allowing accurate adjustment of the rotating angle of the camera module 30.

Furthermore, the height of the camera module 30 taken along an axis Z can also be adjusted by moving the securing members 2125 in the sliding holes 2123. The securing members 2125 can be positioned in any of the sliding holes 2123 due to the frictional forces generated between the securing members 2125, the support member 21 and the second adjustment member 224, thus maintaining the camera module 30 at a desired height.

In alternative embodiments, the second adjustment member 224 may be slidably assembled on the support member 21 via other means, for example, the support member 21 may define two sliding grooves in opposite sides, the second adjustment member 224 may form two sliding rails engaged in the sliding grooves of the support member 21. Thus, the sliding holes 2123 and the securing members 2125 may be omitted.

It is believed that the present embodiments and their advantages will be understood from the foregoing description, and it will be apparent that various changes may be made thereto without departing from the spirit and scope of the disclosure or sacrificing all of its material advantages.

What is claimed is:
1. A support stand, comprising:
a support member; and
a connecting module assembled on the support member, the connecting module comprising:
a first adjustment member;
a first connection member rotatably connected to the first adjustment member;
two first clamping members assembled on the first adjustment member to clamp the first connection member, the first clamping members capable of adjusting the rotating angle of the first connection member around a first axis;
a second adjustment member assembled on the support member;
a second connection member rotatably connected to the second adjustment member;
a fixing member connecting the first adjustment member and the second connection member; and
two second clamping members assembled on the second adjustment member to clamp the second connection member, the second clamping members capable of adjusting the rotating angle of the second connection member around a second axis.

2. The support stand of claim 1, wherein each of the first and second connection members forms a pivotal portion, and each of the first and second adjustment members defines a receiving groove to receive the pivotal portion.

3. The support stand of claim 2, further comprising two fastening members, wherein the pivotal portions of the first and second connection members are fixed in the receiving grooves of the first and second adjustment members by the fastening members.

4. The support stand of claim 1, wherein each of the first and second adjustment members comprises a main body and two side portions extending substantially perpendicular from opposite sides of the main body; the first connection member is clamped between the two side portions of the first adjustment member by the first clamping members; the second connection member is clamped between the two side portions of the second adjustment member by the second clamping members.

5. The support stand of claim 4, wherein each side portion of the first and second adjustment members defines a threaded hole; the first and second clamping members are respectively received in the threaded holes of the first and second adjustment members.

6. The support stand of claim 5, wherein each of the first and second adjustment members comprises a ring-shaped ruler positioned on the periphery of the threaded hole.

7. The support stand of claim 1, wherein the second adjustment member is slidably assembled on the support member.

8. The support stand of claim 1, wherein the support member comprises a base portion, and a supporting plate extending substantially perpendicular from the base portion.

9. The support stand of claim 8, wherein the supporting plate defines a plurality of sliding holes; the second adjustment member defines a plurality of mounting holes; the support stand further comprises a plurality of securing members slidably inserted through the sliding holes of the supporting plate and engaged in the mounting holes of the second adjustment member.

10. An imaging measurement device comprising:
a camera module; and
a support stand supporting the camera module, the support stand comprising:
a support member; and
a connecting module assembled on the support member and fixed to the camera module;
wherein the connecting module comprises a first adjustment member, a first connection member fixed to the camera module and rotatably connected to the first adjustment member, two first clamping members assembled on the first adjustment member to clamp the first connection member, a second adjustment member assembled on the support member, a second connection member rotatably connected to the second adjustment member, two second clamping members assembled on the second adjustment member to clamp the second connection member, and a fixing member connecting the first adjustment member and the second connection member; the first clamping members are capable of adjusting the rotating angle of the first connection member around a first axis, and the second clamping members are capable of adjusting the rotating angle of the second connection member around a second axis.

11. The imaging measurement device of claim 10, wherein each of the first and second connection members forms a pivotal portion, and each of the first and second adjustment members defines a receiving groove to receive the pivotal portion.

12. The imaging measurement device of claim 11, further comprising two fastening members, wherein the pivotal portions of the first and second connection members are fixed in the receiving grooves of the first and second adjustment members by the fastening members.

13. The imaging measurement device of claim 10, wherein each of the first and second adjustment member comprises a main body, and two side portions extending substantially perpendicular from opposite sides of the main body; the first connection member is clamped between the two side portions of the first adjustment member by the first clamping members; the second connection member is clamped between the two side portions of the second adjustment member by the second clamping members.

14. The imaging measurement device of claim 13, wherein each side portion of the first and second adjustment members defines a threaded hole; the first and second clamping members are respectively received in the threaded holes of the first and second adjustment members.

15. The imaging measurement device of claim 14, wherein each of the first and second adjustment members comprises a ring-shaped ruler positioned on the periphery of the threaded hole.

16. The imaging measurement device of claim 10, wherein the second adjustment member is slidably assembled on the support member.

17. The imaging measurement device of claim 10, wherein the support member comprises a base portion, and a supporting plate extending substantially perpendicular from the base portion.

18. The imaging measurement device of claim 17, wherein the supporting plate defines a plurality of sliding holes; the second adjustment member defines a plurality of mounting holes; the support stand further comprises a plurality of securing members slidably inserted through the sliding holes of the supporting plate and engaged in the mounting holes of the second adjustment member.

19. The imaging measurement device of claim 10, wherein the camera module comprises a camera lens, a light source positioned below the camera lens, and a rear plate fixing the camera lens and the light source.

20. The imaging measurement device of claim 10, wherein the first connection member is fixed on the rear plate of the camera module.

* * * * *